United States Patent
Soua et al.

(10) Patent No.: US 8,454,919 B2
(45) Date of Patent: Jun. 4, 2013

(54) PRODUCTION OF PRECIPITATED SILICA

(75) Inventors: Zied Soua, Villeurbanne (FR); Cyril Boitelle, Villeurbanne (FR)

(73) Assignee: Rhodia Operations, Aubervilliers (FR)

( * ) Notice: Subject to any disclaimer, the term of this patent is extended or adjusted under 35 U.S.C. 154(b) by 164 days.

(21) Appl. No.: 12/989,160

(22) PCT Filed: Apr. 24, 2009

(86) PCT No.: PCT/FR2009/050767
§ 371 (c)(1),
(2), (4) Date: Apr. 7, 2011

(87) PCT Pub. No.: WO2009/138678
PCT Pub. Date: Nov. 19, 2009

(65) Prior Publication Data

US 2011/0176985 A1 Jul. 21, 2011

(30) Foreign Application Priority Data

Apr. 25, 2008 (FR) ...................... 08 52796

(51) Int. Cl.
*C01B 33/12* (2006.01)
*B01D 37/02* (2006.01)
*C02F 1/00* (2006.01)

(52) U.S. Cl.
USPC ............................ 423/339; 423/335; 210/777

(58) Field of Classification Search
USPC .................. 423/335–340; 210/777, 778, 806, 210/807
See application file for complete search history.

(56) References Cited

U.S. PATENT DOCUMENTS

| 2,496,736 | A | * | 2/1950 | Maloney | ........................ 423/339 |
| 3,988,162 | A | * | 10/1976 | Wason | ........................... 106/492 |
| 4,617,380 | A | * | 10/1986 | Hinson et al. | .................. 534/576 |
| 5,587,416 | A | | 12/1996 | Chevallier et al. | |
| 5,605,569 | A | * | 2/1997 | Boyer et al. | ................... 106/482 |

FOREIGN PATENT DOCUMENTS

| EP | 0520862 B1 | 12/1992 |
| FR | 1456256 | 1/1967 |
| GB | 1127330 | 9/1968 |
| WO | WO 02/051749 A1 | 7/2002 |

OTHER PUBLICATIONS

International Search Report corresponding to PCT/FR 2009/050767.

* cited by examiner

*Primary Examiner* — Anthony J Zimmer
(74) *Attorney, Agent, or Firm* — SNR Denton US LLP

(57) ABSTRACT

Precipitated silica is produced by a process that includes a step for filtering and washing an aqueous suspension (S), comprising the following steps:
 (a) filtering a first portion (S1) of a precipitated silica suspension (S), whereby a cake (G1) is formed and said cake (G1) is then washed and a suspension (S'1) is formed by suspending the thereby obtained washed cake (G1), notably by dilution with water;
 (b) filtering a second portion (S2) of the suspension (S), whereby a cake (G2) is obtained; and
 (c) filtering said suspension (S'1) emanating from step (a) through the cake (G2) obtained at the end of step (b), employed as a filtration precoating layer.

8 Claims, 1 Drawing Sheet

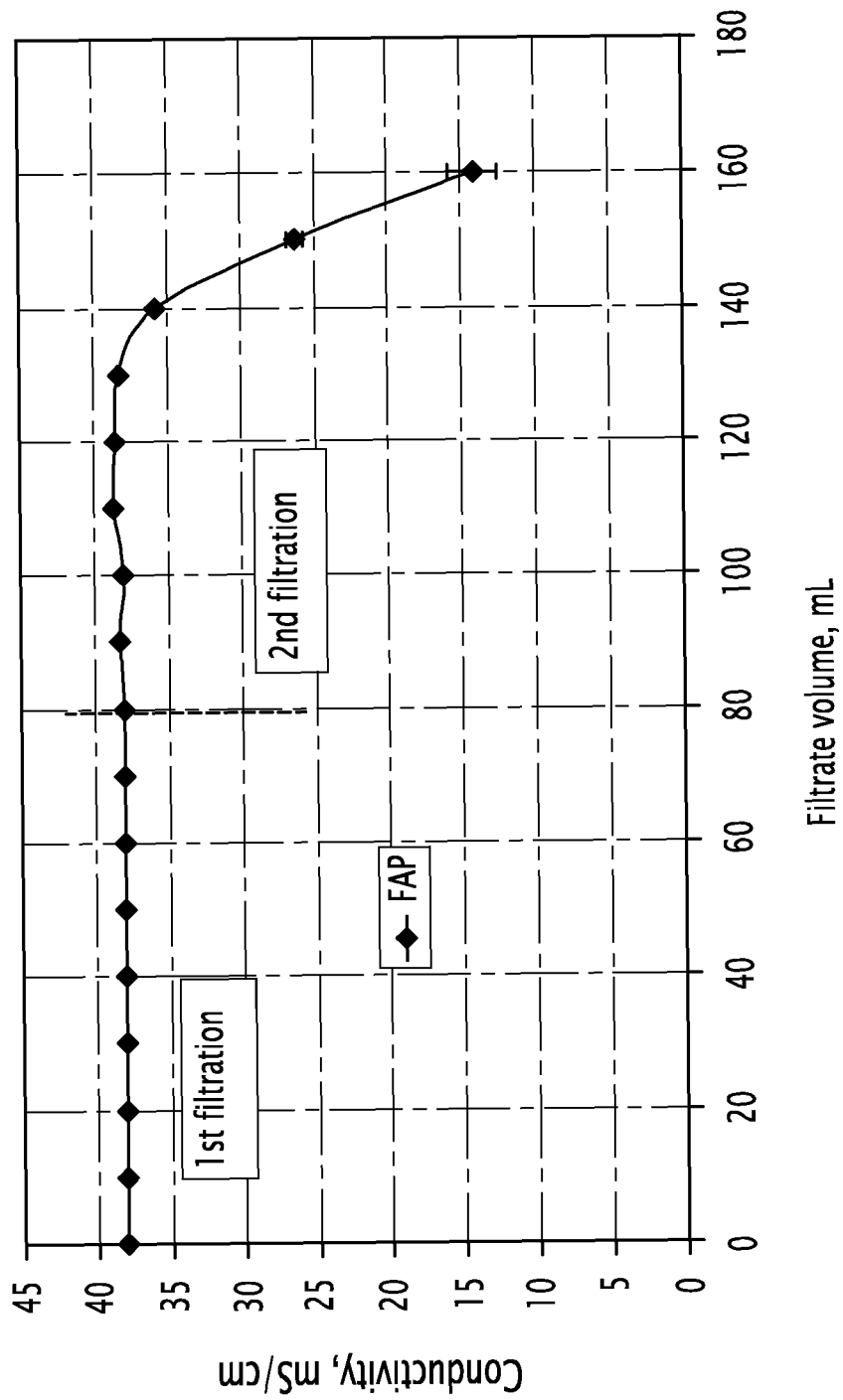

PRODUCTION OF PRECIPITATED SILICA

CROSS-REFERENCE TO PRIOR APPLICATIONS

This application claims priority under 35 U.S.C. §119 of FR 0852796, filed Apr. 25, 2008, and is a continuation of PCT/FR 2009/050767, filed Apr. 24, 2009 and designating the United States (published in the French language on Nov. 19, 2009, as WO 2009/138678 A1; the title and abstract were also published in English), each hereby expressly incorporated by reference in its entirety and each assigned to the assignee hereof.

The object of the present invention is a novel method for preparing precipitated silica.

Precipitated silica has been used for a long time as a reinforcing white filler in elastomers, and in particular in tyres.

Preparation of precipitated silica is carried out by precipitation of silicate, in particular a silicate of an alkaline metal, with an acidifying agent followed by a step for separation by filtration in order to obtain a filtration cake and by a step for washing said cake, notably with the purpose of removing the soluble salts formed during the acidification step, which may prove to be a penalty for applications of the obtained product, and then by an optional step for disintegrating the filtration cake and a drying step for said cake, for example by atomization.

During the filtration of the precipitate silica suspension, the washing step corresponds for most of the time to about 40% of the overall cycle time, which notably comprises the filtration, washing and compacting steps.

Thus, one of the objects of the present invention consists of providing a method with which the washing time may be reduced, while advantageously retaining the final performance, i.e. the residual level of soluble salts relatively to the silica.

One of the objects of the present invention therefore preferentially consists of increasing the productivity of the method for preparing the precipitated silica, notably as compared with the methods of the state of the art, and this generally by at least about 5%, in particular by at least about 20%, for example by up to about 50%.

Another object of the present invention consists of reducing the amount of water used during the preparation of precipitate silica, in particular as compared with the methods of the state of the art.

Notably, with these purposes, filtration and washing are grouped together in a single operation in the method according to the invention.

Thus, the present invention relates to a method for preparing precipitated silica including a step for filtering and washing an aqueous suspension (S), said suspension (S) stemming from the reaction of a silicate with an acidifying agent, said method comprising the steps wherein:

(a) a first portion (S1) of the precipitate silica (S) is filtered, whereby a cake (G1) is formed, and then said cake (G1) is washed and a suspension (S'1) is formed by notably suspending the thereby obtained washed cake (G1) by dilution with water;

(b) a second portion (S2) of the suspension (S) is filtered, whereby a cake (G2) is obtained; and (c) said suspension (S'1), stemming from step (a) is filtered through the cake (G2) obtained at the end of step (b), thereby used as a filtration precoating layer.

At the end of step (c), a new cake (G3) is formed on the cake (G2) in order to form a global cake (G4) which corresponds to the combination of the cakes (G2) and (G3).

The suspension (S) of precipitate silica may, generally, be any dispersion based on precipitate silica particles. The term of "precipitated silica" designates in the sense of the present description, any silica obtained by reaction of silicate with an acid, according to any mode of preparation, by adding an acid on a silicate starter or else by simultaneous, total or partial addition of acid and of silicate on a water or silicate starter. The suspension (S) is generally slurry of silica as obtained at the end of such reactions, to which different additives may optionally be added.

The present invention relates to a method for preparing precipitated silica without any limitation to a particular type of precipitated silica.

Preferably, the precipitated silica present in the suspension (S) is a precipitation silica which, once dried, has a specific BET surface area generally comprised between 80 and 500 $m^2/g$, in particular between 100 and 350 $m^2/g$, for example between 120 and 260 $m^2/g$, and a specific CTAB surface area comprised between 80 and 400 $m^2/g$, and in particular between 100 and 300 $m^2/g$, for example between 100 and 240 $m^2/g$. The specific BET surface area is determined according to the BRUNAUER-EMMET-TELLER method described in "The Journal of the American Chemical Society", Vol. 60, page 309, February 1938 and corresponding to the NF ISO 9277 standard (December 1996). The specific CTAB surface area is the external surface area which may be determined according to the method described in the NF ISO 5794-1 standard (February 2006, $2^{nd}$ edition 2006-03).

As precipitation silicas particularly suitable for applying the method of the invention, mention may notably made of precipitation silicas obtained according to the methods for example described in applications EP 0 520 862, WO 95/09127, WO 95/09128, WO 98/54090 or WO 03/016215.

The aforementioned step (a) for suspending the washed cake (G1) corresponds to a step for re-pulping said cake. (G1) is also designated as a re-pulped cake.

The aforementioned step (b) consists of forming a cake (G2) which subsequently is also designated as a precoating layer.

The method according to the present invention therefore consists in a first step of forming a precoating layer of cake (G2), by filtering the suspension (S2), and then of filtering on this precoating layer a slurry advantageously containing a small soluble salt content, notably sulfate content (suspension (S'1)).

The method of the present invention comprises two main steps. During the first step, a cake precoating layer is formed by filtration of the silica slurry stemming from the precipitation reaction (suspension (S2)). This suspension and the precoating layer which follows therefrom, contain an amount of soluble salt, notably of sulfate, which varies from one silica grade to another. They also contain agglomerates (also called flocks) formed because of the interaction forces between the solid particles. Therefore, the specific resistance of the precoating layer is rather low since it is formed by flocks, thereby increasing its porosity.

The second filtration step consists of filtering on the precoating layer a slurry obtained by re-pulping a silica cake formed beforehand by filtration followed by washing of the silica suspension (S1). This slurry contains, relatively to the slurry stemming from the reaction, a larger amount of fine particles following the action of the washing and re-pulping.

When the "clean" slurry (or suspension (S'1)) comes into contact with the precoating layer, a second cake is formed. The liquid contained in this second slurry gradually repels the liquid contained in the precoating layer (which contains a large amount of soluble salt, notably of sulfate). Thus, at the end of the filtration, there only remains in the cake the liquid stemming from the "clean" slurry.

The concentration of soluble salt, notably of sulfate, in the final cake, after the two filtration steps, is not necessarily equal to that of the slurry used during the second filtration step. By re-pulping it is possible to release the soluble salt, notably the sulfate salt, which is confined in the agglomerates and the removal of which would not have been possible by standard cross-washing.

By final dewatering by compaction, it is possible to discharge an additional amount of soluble salt, notably of sulfate, in order to obtain a final cake containing a minimal amount of soluble salt, notably of sulfate.

The method of the present invention is also designated as a method by filtration with a self-precoating layer (FAP in French).

As mentioned above, by filtering with a self-precoating layer, it is possible to substantially reduce the washing time, as well as the amount of consumed water.

With this reduction in the washing time, it is possible to reduce the duration of the cycle.

Thus, the method of the present invention provides reduction in the total cycle time (from the loading of the filters, notably filter presses, up to plate opening). In standard methods of the state of the art, the cycle time is of the order of 6,000 seconds; within the scope of the method of the invention with filtration with self-precoating layer, the cycle time is advantageously less than 6,000 seconds, preferably less than 5,000 seconds, or even less than 3,500 seconds, and in particular is equal to about 3,000 seconds.

This reduction in cycle time results in an increase in the productivity.

An additional gain may be provided increasing the amount of silica per cycle. Indeed, the slurry obtained after re-pulping (suspension S'1) contains less flocks than a reaction slurry (S), therefore (S'1) contains more free water easy to discharge by filtration. The cake stemming from the filtration of (S'1) is then more compressible, therefore its thickness decreases relatively to that of a cake stemming from a reaction slurry (S). This difference in thickness relatively to a cake formed by an ordinary reaction slurry (S) may be used for loading more silica, therefore more slurry.

With the method according to the present invention it is also possible to obtain a precipitated silica having a level of soluble salt, notably of sulfate, of at most 2%, preferably of at most 1.6%, in particular less than 1% and for example less than 0.3%. This low level of soluble salt, in particular of sulfate, favors certain applications, notably in elastomers or silicones. Considering the absorption properties, applications may also be contemplated for example in the field of paper or of supports for liquids, in particular used in animal feed (such as vitamins (notably vitamin E), choline choride). Applications may also be provided in the field of rheology modification of media, for example as a thickening agent for toothpaste. Applications such as an anti-caking or viscosifying additive or as an element for battery separators may also be contemplated.

Advantageously, the dryness (or dry extract content) of the cakes obtained at the end of the method by filtration with a self-precoating layer is greater than 20%, preferably greater than 22%, notably comprised between 23 and 30%, for example comprised by 23 and 27% by weight. Thus, it was noticed that the dryness gain as compared with standard methods is generally of about at least 2-3%, which then entails a gain of at least 12% of the amount of water to be evaporated per ton of finished product and therefore a corresponding gain on the consumed energy upon drying.

With the method according to the present invention it is also possible to get rid of the drawbacks of the methods of the state of the art such as the cross-washing and water-washing methods by the central core.

More particularly, cross-washing usually has the drawback of being long since the water crosses the whole cake along a diagonal. It also generally consumes water. Indeed, during the washing, preferential paths are generated under the effect of the washing pressure and therefore in order to be able to extract a maximum of salt, a rather large amount of water has to be passed through.

As regards the washing by the core after the filtration step, water generates preferential paths (or by-passes) through the cake and is favorably directed towards the holes which are for example located on the upper right and on the lower left. This generally has the result of having both quarters of the cake on the upper right and on the lower left well washed and both quarters of the cake on the upper left and on the lower right very poorly washed.

The method according to the invention for filtration with a self-precoating layer allows this problem of preferential paths to be solved. Indeed, by the presence of the solid silica particles in the re-pulped slurry, the preferential paths are rapidly clogged and the water is distributed over the whole cake homogeneously.

According to an advantageous embodiment of the invention, the mass ratio between the amount of dry silica in the cake or the precoating layer (G2) and the amount of dry silica in the re-pulped cake (G1) is comprised between 50/50 and 85/15.

The method of the present invention is preferably further characterized in that the step for re-suspending the washed cake (G1) is carried out in the presence of 15 to 60 g/L of silica in the suspension (S'1).

According to a particular embodiment of the invention, the filtration steps (b) and (c) are carried out on a filter press.

By using filter press(es), it is possible to accomplish compaction and to therefore have the possibility of removing an additional amount of soluble salts, notably sulfates, by dewatering.

According to another particular embodiment of the invention, the filtration step (a) is carried out on a rotary filter.

Within the scope of the method of the present invention, it is possible to combine the use of filter presses and of rotary filters.

In the method according to the invention, the suspension (S) usually contains a salt from the acidifying agent which was used for precipitating the silica; more particularly, the suspension (S) contains sodium sulfate.

Generally, said suspension (S) contains from 5 to 30%, in particular from 10 to 20%, by weight of salt from the acidifying agent which was used for precipitating the silica, and notably of sodium sulfate.

According to a preferred embodiment of the method according to the invention, the filtration step (c), at the end of which a filtration cake (G4) is obtained, is followed by a step for drying said obtained cake.

This step (c) may also, if necessary, be followed by any step for shaping the cake (G4).

With the method according to the present invention it is possible to reduce water consumption. Preferably, within the scope of the method of the invention, the amount of water consumed is comprised between 5 and 10, notably between 6 and 8 kilograms of water per kilogram of dry silica.

Advantageously, the filtration webs used in the method according to the invention may have a much longer life-time than that of the webs used in the methods of the state of the art.

Finally, with the method of the invention it is possible to improve productivity not only at the filter itself, but of the overall washing filtration step in the method for making the silica.

EXAMPLES

Example 1

Laboratory Method

1. Suspension

The suspension used (S) is a silica slurry Z1165MP which has the following characteristics:

| | |
|---|---|
| Temperature | 70° C. |
| pH | 4.4-5.2 |
| Humidity | 99.0-90.2% |

During the handling operations, the slurry is placed in a water bath in order to maintain its temperature.

2. Filtration

The slurry from the precipitation reaction (S) is placed in the feed pan and then filtered under 4 bars, until 80 mL of filtrate is obtained, indicating the formation of the precoating layer (G2) (half of the filled chamber) and the end of the first filtration step.

During the second step, the washed and re-pulped slurry (S'1) from the cake (G1), is filtered at the same pressure of 4 bars until a second cake is formed on the precoating layer. The filtration is stopped after obtaining additional 80 mL of filtrate. The filtrate of this cake, poor in sulfates, crosses the precoating layer and carries away the sulfates which it contains. With the compaction, the excess sulfates may be discharged. A final cake is obtained with an amount of sulfates of less than 1% by weight.

3. Results

The results are indicated in FIG. 1, which illustrates the curve tracking the conductivity (mS/cm) of the filtrate during the method of the invention versus the volume of the filtrate (mL). Measurements were conducted on 10 mL samples of filtrate. On this curve, two parts are distinguished: a first part, between V=0 mL and V=80 mL, which corresponds to the filtration of the slurry from the reaction (step (b) of the method) and a second part, between V=80 mL and V=160 mL, which corresponds to the filtration of the slurry containing a very small amount of sulfate (step (c) of the method).

On the first part of the curve (first filtration step), the conductivity of the filtrate is constant (this is the case of standard filtration). On the second part of the curve (second filtration step), two phases are observed.

A first phase is located between V=80 mL and V=130 mL, where the conductivity is constant and also equal to the conductivity of the liquid contained in the precoating layer. This is due to the fact that the liquid from the "clean" slurry pushes the one containing the sulfates (initially trapped in the precoating layer) by a piston effect.

At the end of the filtration, a drop in conductivity is observed indicating sulfate depletion of the precoating layer (second phase, V>130 mL). The conductivity of the compaction liquid is equal to 2 mS/cm.

Five tests were carried out and the results are shown in the table hereafter:

| Ratio | 1st filtration duration | 2nd filtration duration | Total filtration duration | % of sulfates |
|---|---|---|---|---|
| 50-50 | 48 s | 200 s | 248 s | 0.6 |
| 50-50 | 45 s | 220 s | 265 s | 0.8 |
| 50-50 | 51 s | 198 s | 249 s | 0.6 |
| 50-50 | 48 s | 210 s | 258 s | 0.7 |
| 50-50 | 47 s | 200 s | 247 s | 0.6 |

In the first column of this table appears the ((solid) silica contained in the precoating layer (G2))/((solid) silica contained in the second cake (G3)) ratio. In this example, the same amount of dry silica is thus contained in the precoating layer (G2) and in the cake which forms on top (G3).

It is to be noted that during the second filtration step, a slurry is filtered, containing more fine particles than a slurry from the precipitation reaction of. Grain size measurements were thus conducted on a slurry from the reaction and on a slurry from a washed and re-pulped cake.

The results are shown in the following table:

| Diameter | Reaction slurry | Re-pulped slurry |
|---|---|---|
| D (0.1), μm | 14.2 | 8.3 |
| D (0.5), μm | 95.4 | 28.7 |
| D (0.9), μm | 422.1 | 127.1 |

It is recalled that the value given for D (0.1) means that 10% in volume of the solid particles have a diameter of less than this value; also the value given for D (0.5) means that 50% in volume of solid particles have a diameter of less than this value and the value given for D (0.9) means that 90% in volume of the solid particles have a diameter of less than this value.

In a standard filtration, the drawbacks relating to the filtration of a suspension containing a large amount of fine particles lie in the high specific resistance of the cake on the one hand, which is expressed by a quite long filtration time, and in the risk of clogging of the filtration webs on the other hand.

Both drawbacks are strongly reduced by the presence of the precoating layer.

Indeed, during the first step of filtration, the suspension and the formed precoating layer contain agglomerates obtained by interaction forces between the solid particles. These flocks protect the filtration webs against clogging by the fine particles of the second slurry. This may be checked by turbidity measurements.

Example 2

The reaction slurry (S) used in this example is a reaction slurry of industrial Z1165MP. The re-pulped slurry (S'1) is prepared from a cake stemming from the suspension S washed and resuspended at 35 g/l in $SiO_2$.

The following operating procedure was used:
- loading of 690 litres into the filter of the rectional slurry (S) allowing formation of the precoating layer (G1);
- loading of 215 litres into the filter of the re-pulped slurry (S'1);
- compaction (a cake G3 is obtained).

The following table characterizes the obtained product as well as the performances of this type of filtration.

| Reaction slurry (S) silica % | Re-pulped slurry (S'1) silica % | Duration of the cycle (s) | Dryness of the cake (G3) (%) | Residual sulfates (%) | Washing ratio (kg of water for 1 kg silica) | Global productivity of the step (kg/m$^2$/h) |
|---|---|---|---|---|---|---|
| 83 | 17 | 1350 | 23.4 | 0.6 | 5.1 | 6.2 |

The dryness is measured on a cake after compaction. The cake is placed on Sartorius thermoscales at 160° C. for 40 minutes.

A 56% gain in global productivity of the washing filtration step as compared with the standard method and a 64% decrease in the washing water amount are recorded.

The invention claimed is:

1. A process for the production of a precipitated silica including a step for filtering and washing an aqueous suspension (S), comprising:
   (a) filtering a first portion (S1) of a precipitated silica suspension (S) to form a cake (G1) and said cake (G1) is then washed and a suspension (S'1) is formed by suspending the obtained washed cake (G1), optionally by dilution with water;
   (b) filtering a second portion (S2) of the suspension (S), whereby a cake (G2) is obtained; and
   (c) filtering said suspension (S'1) emanating from step (a) through the cake (G2) obtained at the end of step (b), the cake (G2) being a filtration precoating layer.

2. The process as defined by claim 1, wherein the mass ratio of dry silica in the precoating layer (G2) to the amount of dry silica in the suspension (S'1) ranges from 50/50 to 85/15.

3. The process as defined by claim 1, wherein the step for suspending the washed cake (G1) is carried out in the presence of 15 to 60 g/L of silica in the suspension (S'1).

4. The process as defined by claim 1, wherein the filtration steps (b) and (c) are carried out in a filter press.

5. The process as defined by claim 1, wherein the filtration step (a) is carried out in a rotary filter.

6. The process as defined by claim 1, wherein the suspension (S) contains sodium sulfate.

7. The process as defined by claim 6, wherein the suspension (S) contains from 5 to 30% by weight of sodium sulfate.

8. The process as defined by claim 1, wherein the step (c) is followed by a step of drying the cake obtained at the end of said step (c).

* * * * *